(12) United States Patent
Badakere Ramachandra et al.

(10) Patent No.: US 8,565,755 B1
(45) Date of Patent: Oct. 22, 2013

(54) NETWORK CONTROL OF RADIO RESOURCES TO MITIGATE NETWORK OVERUSE BY MACHINE TO MACHINE DEVICES

(75) Inventors: Venkatesh Badakere Ramachandra, San Jose, CA (US); Dhiraj Ballal, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 430 days.

(21) Appl. No.: 12/895,632

(22) Filed: Sep. 30, 2010

(51) Int. Cl.
| | |
|---|---|
| H04W 24/00 | (2009.01) |
| H04M 1/66 | (2006.01) |
| H04M 1/68 | (2006.01) |
| H04M 3/16 | (2006.01) |
| G01R 31/08 | (2006.01) |
| G06F 11/00 | (2006.01) |
| G06F 12/14 | (2006.01) |
| G06F 12/16 | (2006.01) |
| G08C 15/00 | (2006.01) |
| H04J 1/16 | (2006.01) |
| H04J 3/14 | (2006.01) |
| H04L 12/26 | (2006.01) |
| H04L 1/00 | (2006.01) |
| G08B 23/00 | (2006.01) |

(52) U.S. Cl.
USPC ............ 455/424; 455/411; 726/22; 726/23; 726/3; 370/230; 370/235; 370/242

(58) Field of Classification Search
USPC .......... 455/424, 411; 726/22, 23, 3; 370/230, 370/235, 242
See application file for complete search history.

(56) References Cited

U.S. PATENT DOCUMENTS

| | | | | |
|---|---|---|---|---|
| 2006/0288413 | A1* | 12/2006 | Kubota | 726/23 |
| 2011/0199905 | A1* | 8/2011 | Pinheiro et al. | 370/235 |
| 2011/0235569 | A1* | 9/2011 | Huang et al. | 370/315 |
| 2011/0310731 | A1* | 12/2011 | Park et al. | 370/230 |
| 2012/0140632 | A1* | 6/2012 | Norp et al. | 370/235 |

OTHER PUBLICATIONS

3GPP TS 36.413 V9.2.1 (Apr. 2010), "$3^{rd}$ Generation Partnership Project; Technical Specification Group Radio Access Network; Evolved Universal Terrestrial Radio Access Network (E-UTRAN); S1 Application Protocol (S1AP) (Release 9)," 244 pages.

3GPP TS 29.274 V9.3.0 (Jun. 2010), "$3^{rd}$ Generation Partnership Project; Technical Specification Group Core Network and Terminals; 3GPP Evolved Packet System (EPS); Evolved General Packet Radio Service (GPRS) Tunneling Protocol for Control plane (GTPv2-C); Stage 3 (Release 9)," 159 pages.

* cited by examiner

Primary Examiner — Opiribo Georgewill
(74) Attorney, Agent, or Firm — Harrity & Harrity, LLP

(57) ABSTRACT

Malfunctioning machine to machine (M2M) devices in a wireless network can be detected and blocked from the network. In one implementation, a device may monitor uplink traffic from a M2M device and determine, based on the monitoring, whether the M2M device is malfunctioning with respect to an uplink data rate of the M2M device. The device may transmit, in response to the determination that the M2M device is malfunctioning, one or more messages instructing network devices to delete communication sessions corresponding to the M2M device, where at least one of the one or more messages is associated with a time period value indicating a time period in which the deletion of the communication session is to be enforced.

22 Claims, 10 Drawing Sheets

US 8,565,755 B1

NETWORK CONTROL OF RADIO RESOURCES TO MITIGATE NETWORK OVERUSE BY MACHINE TO MACHINE DEVICES

BACKGROUND

Machine-to-Machine (M2M) communications may refer to technologies that allow devices to communicate with one another over wired or wireless networks. An M2M device may include a sensor, meter, or other device that captures an "event" (temperature, inventory level, etc.), which is relayed through a network (wireless, wired or hybrid) to an application that translates the captured event into meaningful information (e.g., items need to be restocked).

M2Mapplications are commonly deployed using wireless systems such as the Universal Mobile Telecommunications System (UMTS) or Long Term Evolution (LTE). M2M devices using UMTS/LTE for machine communication can be found in a number of economic sectors, such as security, product tracking, health care, and remote monitoring and diagnostics.

M2M devices typically generate relatively little data. For example, a M2M device that is used to monitor a vending machine may transmit once daily status updates, of only a few kilobytes of data, to a server. As a result, service providers for M2M devices may bill the M2M operator based on the assumption that the M2M device will use relatively little network bandwidth. Sometimes, however, a M2M device may malfunction or be compromised by a malicious party, causing the M2M device to use a larger share of the network resources. For example, the M2M device may go bad and start jamming the radio interface or generate too many network signaling messages.

SUMMARY

One implementation is directed to a network device-implemented method. The method may include monitoring uplink traffic from a M2M device; determining, based on the monitoring, whether the M2M device is malfunctioning with respect to an uplink data rate of the M2M device; and transmitting, by the network device and in response to the determination that the M2M device is malfunctioning, one or more messages instructing other network devices to delete communication sessions corresponding to the M2M device, where at least one of the one or more messages is associated with a time period value indicating a time period in which the deletion of the communication session is to be enforced.

Another implementation is directed to a network device that includes an uplink traffic monitor component to: monitor uplink network traffic received from a wirelessly connected M2M device, and determine, based on the monitoring, whether the M2M device is transmitting at an uplink data rate that is in violation of a network policy for the M2M device. An M2M termination component may, in response to the determination that the M2M device is transmitting at an uplink data rate that is in violation of the network policy: initiate termination of the M2M device in the network by transmitting one or more messages instructing other network devices to delete communication sessions corresponding to the M2M device, where the transmitted one or more message cause at least one radio interface node in the network to block access to a radio interface for the M2M device.

In another implementation, a computing device may include a memory to store multiple instructions and a processor to execute instructions in the memory. The executed instructions may monitor uplink data traffic from a M2M device, determine whether the M2M device is malfunctioning with respect to the uplink data rate of the M2M device, and transmit, in response to the determination that the M2M device is malfunctioning, one or more messages instructing other network devices to delete communication sessions corresponding to the M2M device, where at least one of the one or more messages is associated with a time period value indicating a time period in which the deletion of the communication session is to be enforced.

In yet another implementation, a system may include a gateway device and a radio interface node. The gateway device may monitor uplink network traffic received from a wirelessly connected M2M device in a network; determine, based on the monitoring, whether the M2M device is malfunctioning with respect to the uplink data rate of the M2M device; and transmit, in response to the determination that the M2M device is malfunctioning, a message instructing other network devices to delete communication sessions corresponding to the M2M device. A radio interface node may provide a wireless interface for connection of the M2M device to the network. The radio interface node may receive a message instructing the radio interface node to block the M2M device, and block, in response to the received message, the M2M device from connecting to the network.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

Techniques described herein may relate to the policing of M2M communications in a wireless network. Uplink traffic from an M2M device may be policed based on the uplink data rate. If the policing indicates that the M2M device is misbehaving or malfunctioning, control messages may be transmitted through the network to disconnect the M2M device from the network. In one implementation, radio interface nodes in the network, in response to the disconnect message, may additionally disallow the M2M device to connect to the network for a certain time period. Advantageously, malfunctioning M2M devices may be isolated from the network.

Figure 1:
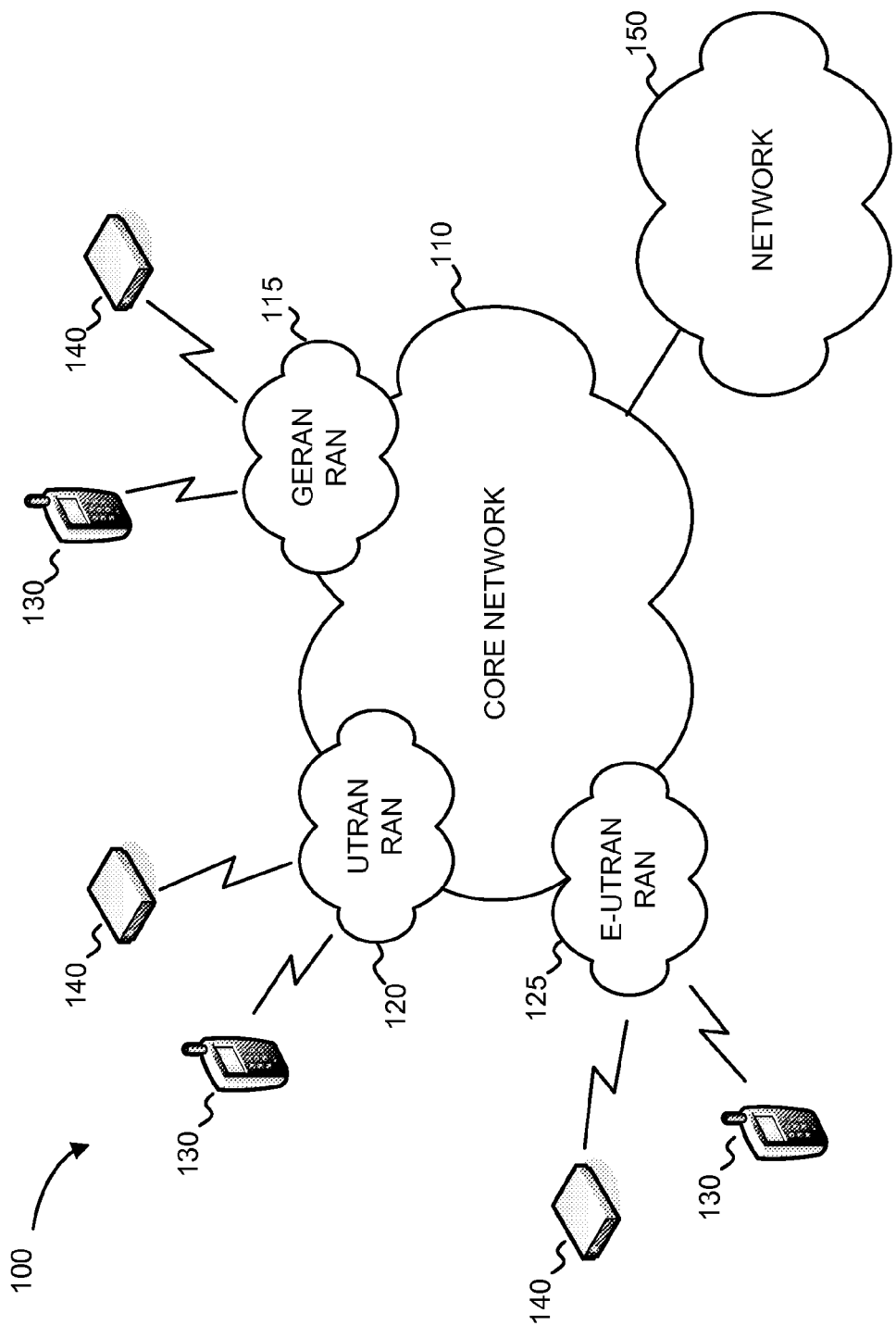
FIG. 1 is a diagram illustrating an example of a telecommunication system.

FIG. 1 is a diagram illustrating an example of a telecommunication system 100. Telecommunication system 100 may include one or more networks designed to connect customers, such as M2M devices, wireless or wired user devices, or computer servers, to one another. System 100 is particularly shown as including a core network 110, which is associated with a number of access networks 115, 120, and 125. Access networks 115, 120, and 125 may generally connect customer devices 130 and 140 to core network 110. Additional networks, such as a network 150 (e.g., an Internet Protocol (IP) network, interexchange carrier network (IXC), and/or local exchange carrier (LEC)) may also connect to core network 110.

Core network 110 may generally provide high capacity communication facilities that connect customer devices 130 and 140 to one another. As illustrated, core network 110 may provide paths for the exchange of information between different networks or sub-networks. Core network 110 may provide network functions relating to one or more of aggregation, authentication, service invocation, service charging, and call control and switching. In one implementation, core network 110 may include a network based on, for instance, the 3GPPP Long Term Evolution (LTE) standard, in which core network 110 facilitates the connectivity of wireless customer devices 130 and 140.

Access networks 115, 120, and 125 may provide connectivity of subscribers, such as customer devices 130 and 140, to core network 110. Three access networks are particularly shown in FIG. 1 as examples of access networks that provide wireless connectivity services. As shown, access network 115 (GERAN RAN) may be a GSM EDGE Radio Access Network. Access network 120 (UTRAN RAN) may be a Universal Mobile Telecommunications System (UMTS) Terrestrial Radio Access Network. Access network 120 may include a collection of nodeBs and radio network controllers that make up the UMTS radio access network. Access network 125 (E-UTRAN RAN) may be an evolved UMTS Terrestrial Radio Access Network. An E-UTRAN RAN may be thought of as the "next generation" version of a UTRAN RAN.

Customer devices 130 and 140 may include devices designed to connect wirelessly to one of access networks 115, 120, and/or 125. Customer devices 130 may be mobile devices, such as mobile telephones, smart phones, electronic notepads, and/or personal digital assistants (PDAs). Customer devices 130 may establish wireless communication sessions with radio interface nodes (e.g., eNodeBs, nodeBs) in access networks 115, 120, and/or 125. The wireless communication sessions may be used for voice (e.g., telephone calls) or data sessions.

Customer devices 140 may include M2M devices. A M2M device, as used herein, may refer to any device that is designed to autonomously communicate with another device or network, such as a server connected to network 150. An M2M device may include a sensor or meter that is designed to capture an event (such as temperature, inventory level, etc.), which is relayed through a network (e.g., access networks 115/120/125, core network 110, and network 150) to an application (e.g., a software application executing as part of a server device connected to network 150), that translates the captured event into meaningful information (for example, items need to be restocked).

Network 150 may include any type of network, such as a public IP packet-based network (e.g., the Internet), a private IP network, an interexchange carrier network, etc. Core network 110 may connect to network 150 via a gateway device that is used to control access to network 150.

Although FIG. 1 illustrates exemplary components of telecommunications system 100, in other implementations, telecommunications system 100 may include additional, fewer, different, or differently arranged components than those illustrated in FIG. 1 and described herein. Moreover, one or more of the functions performed by one of the components shown in FIG. 1 may be performed by other components shown in FIG. 1

Figure 2:
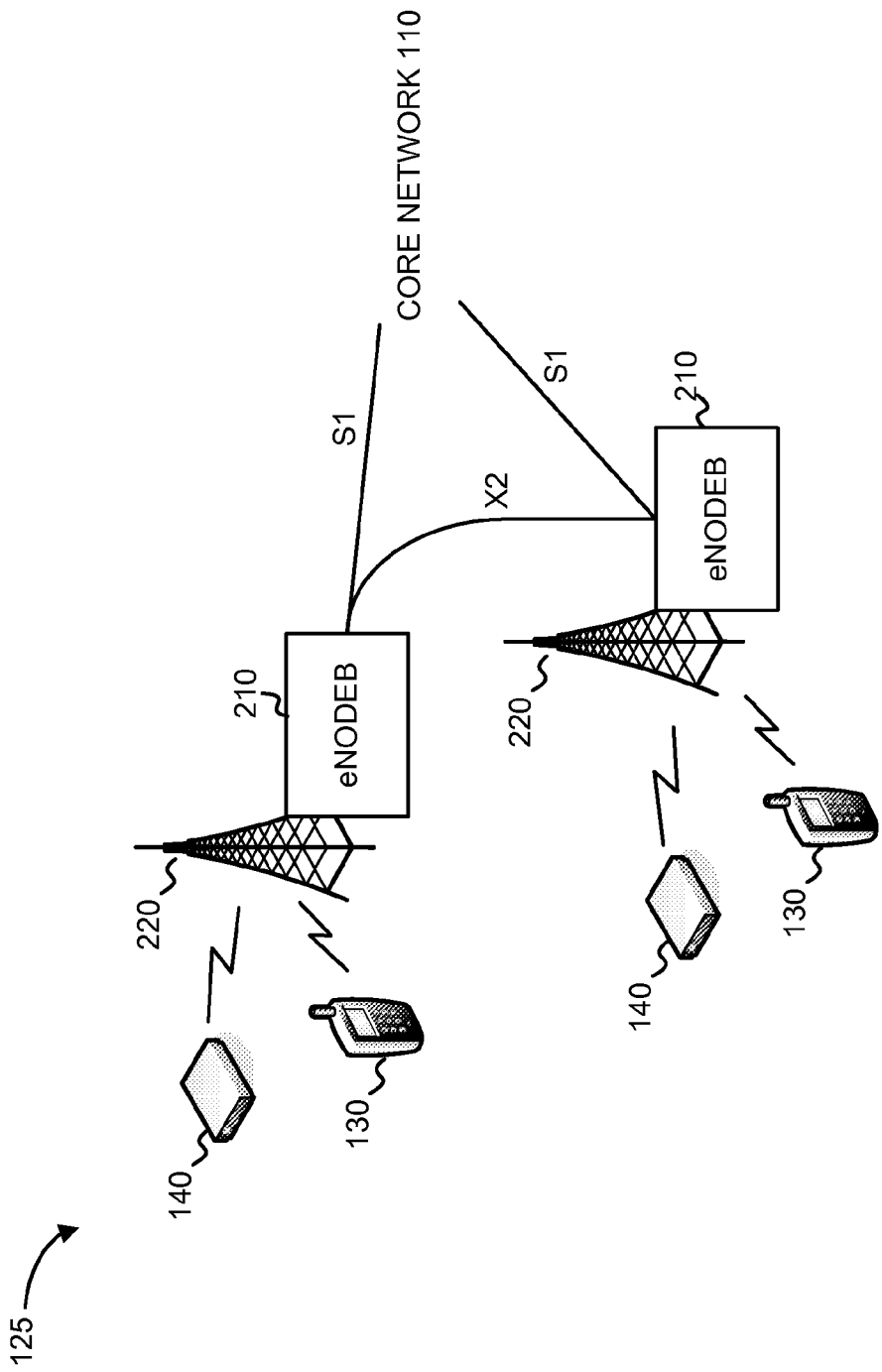
FIGS. 2 and 3 are diagrams illustrating example components of access networks.

FIG. 2 is a diagram illustrating example components of an access network. In this example, access network 125 (E-UTRAN RAN) is illustrated. Other types of access networks (e.g., UTRAN or GERAN) may be alternatively or additionally implemented. The E-UTRAN standard may implement the air interface for LTE systems.

Access network 125 may particularly include eNodeBs 210, which may be associated with corresponding antennas 220. eNodeBs 210 in access network 125 may be connected, such as via a wired connection, to one another. eNodeBs 210 may also connect to core network 110. In one implementation, eNodeBs 210 may connect to one another via a X2 interface and to core network 110 via a Si interface. Each eNodeB 210 may include hardware to communicate with customer devices 130 and 140 using WDCMA/TD-SCDMA (Wideband Code Division Multiple Access/Time Division Synchronous Code Division Multiple Access) as the air interface technology.

Figure 3:
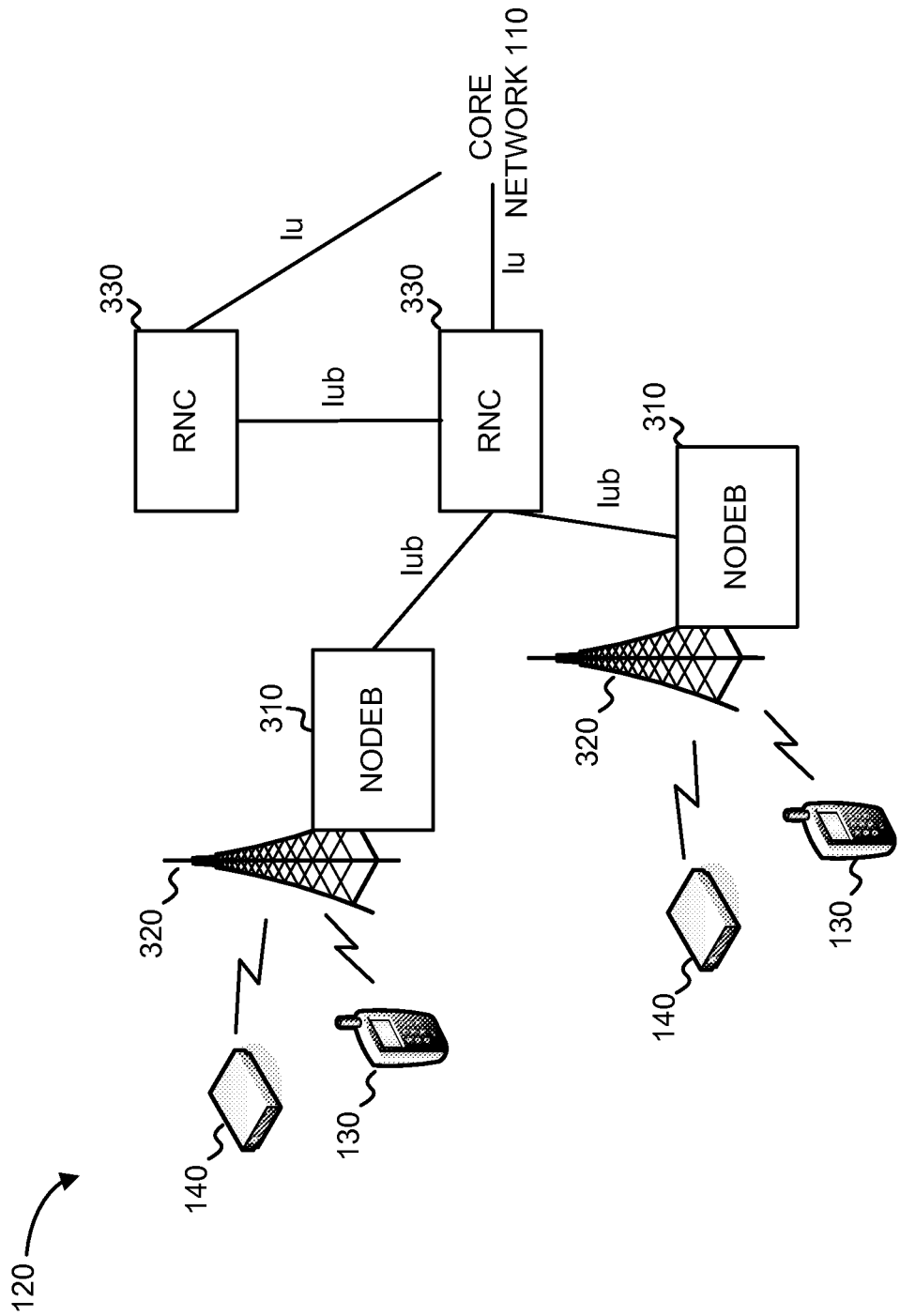

FIG. 3 is a diagram illustrating example components of another access network. In this example, access network 120 (UTRAN RAN) is illustrated. The UTRAN standard may implement a UMTS radio access network.

Access network 120 may particularly include nodeBs 310, which may be associated with corresponding antennas 320. NodeBs 310 in access network 120 may be connected, such as via a wired connection, to one another through radio network controllers (RNCs) 330. RNCs 330 may provide control functions for nodeBs 310. Each RNC 330 may connect to nodeBs 310 via a logical interface called an "Iub" interface. RNCs 330 may connect to core network 110 via a logical interface called an "Iu" interface and to one another through the "Iub" interface.

Although FIGS. 2 and 3 illustrate example components of access networks 120 or 125, in other implementations, access networks 120/125 may include additional, fewer, different, or differently arranged components than those illustrated in FIGS. 2 and 3 and described herein. Moreover, one or more of the functions performed by one of the components shown in FIGS. 2 and 3 may be performed by other components shown in FIGS. 2 and 3.

Figure 4:
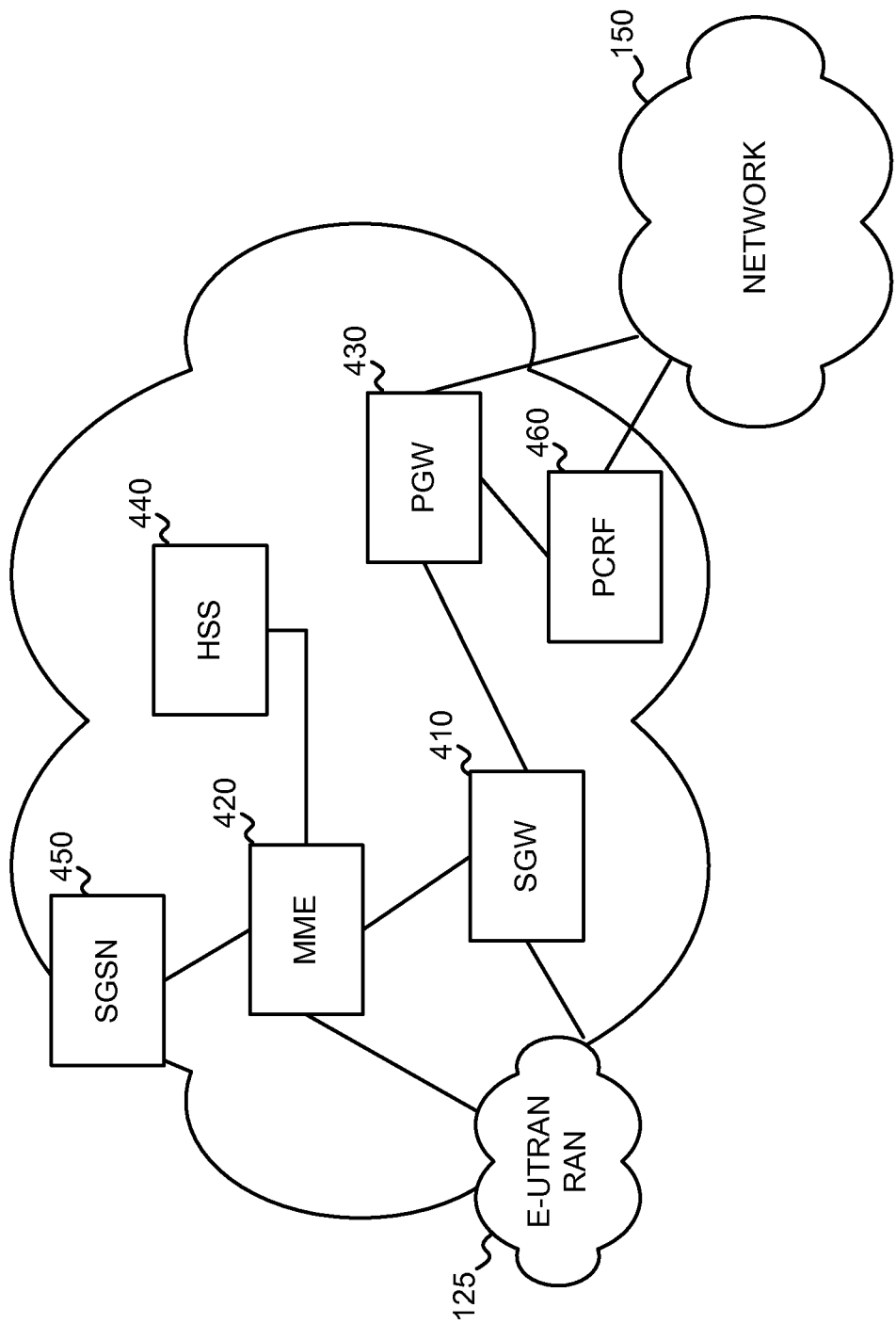
FIG. 4 is a diagram illustrating an example of components in a core network.

FIG. 4 is a diagram illustrating an example of components in core network 110. Core network 110 may be implemented as a flat IP-based network. Core network 110 may include a serving gateway (SGW) 410, a mobility management entity (MME) 420, a packet data network gateway (PGW) 430, a home subscriber service (HSS) 440, a serving GPRS support node (SGSN) 450, and a policy and charging rules function (PCRF) 460.

SGW 410 may include one or more devices that perform signaling conversion between the transport used within an access network and the IP-based transport used within core network 110. SGW 410 may route and forward user data packets, while also acting as the mobility anchor for the user plane during inter-eNodeB handovers and as the anchor for mobility between LTE and other technologies. SGW 410 may also manage and store customer device contexts, e.g. parameters of the IP bearer service and network internal routing information.

MME 420 may include one or more devices that generally act as control-node for core network 110. MME 420 may be responsible for idle mode customer device tracking, may be involved in the bearer activation/deactivation process, and may be responsible for choosing the SGW for a device at the initial attach and at the time of intra-network handovers. MME 420 may also be responsible for authenticating users through interaction with HSS 440.

PGW 430 may include one or more devices that act as a gateway for additional networks, such as network 150. In other words, PGW 430 may provide connectivity from the customer device to external packet data networks by being the point of exit and entry of traffic for the customer device. A customer device may have simultaneous connectivity with more than one PGW 430 for accessing multiple packet data networks. PGW 430 may perform policy enforcement, packet filtering, and other services relating to the access of the customer device to the external packet data network.

HSS 440 may include one or more devices that may act as a master user database for core network 110. HSS 440 may contain profiles for subscribers (customers), perform authentication and authorization of the customers, and may provide information about the subscriber's location and IP information.

SGSN 450 may provide services to one or more access networks and may be generally responsible for the delivery of data packets to and from mobile stations within its geographical service area. SGSN 450 may perform packet routing and transfer, mobility management, logical and link management, and authentication and charging functions.

PCRF 460 may operate in core network 110 to determine policy rules that apply to customer devices 130 and 140. PCFR 460 may access subscriber databases and other systems to allow for the creation of rules and the making of policy decisions relating to subscribers.

Although FIG. 4 illustrates example components in core network 110, in other implementations, core network 110 may include additional, fewer, different, or differently arranged components than those illustrated in FIG. 4 and described herein. Moreover, one or more of the functions performed by one of the components shown in FIG. 4 may be performed by other components shown in FIG. 4.

Figure 5:
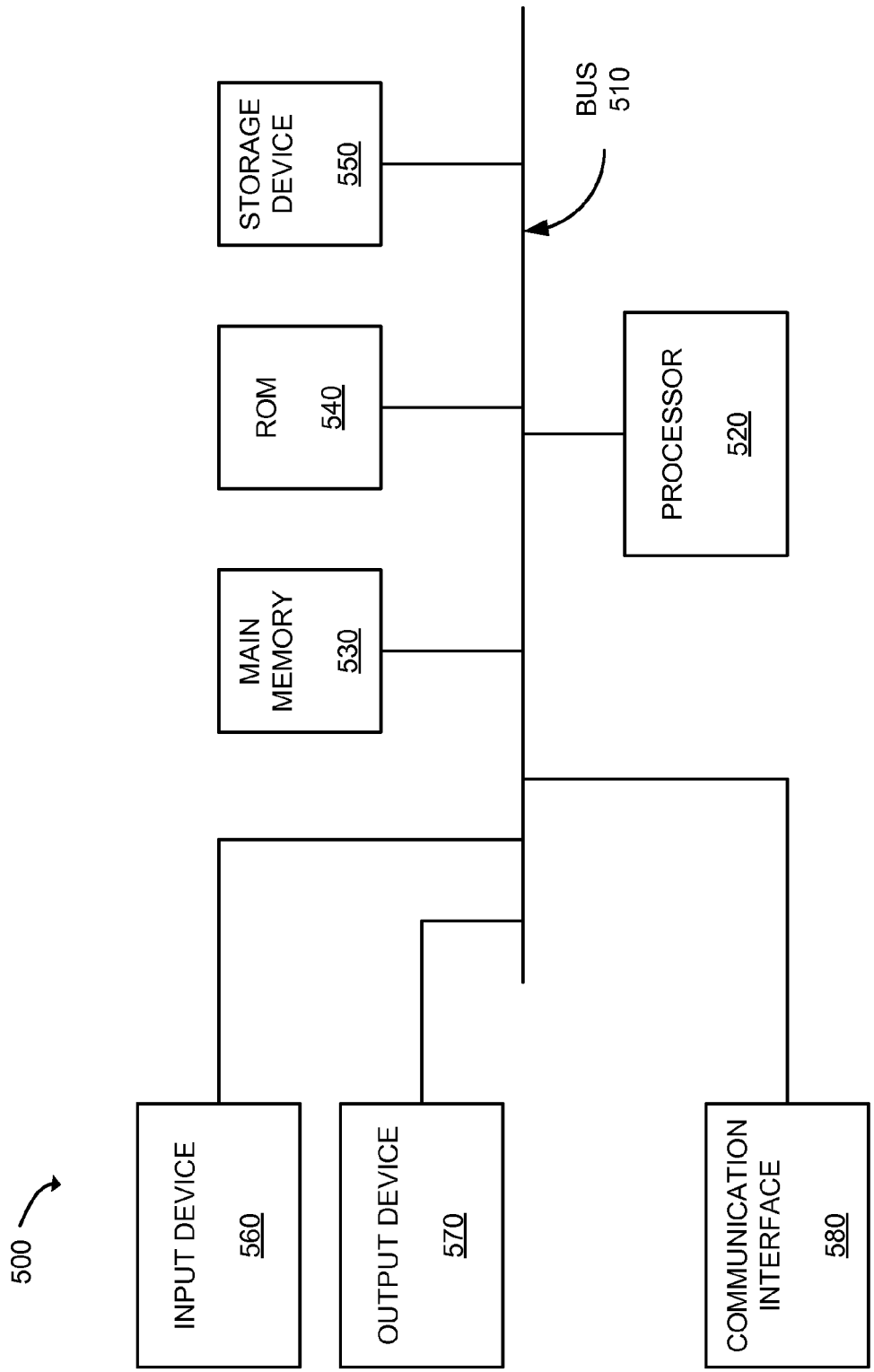
FIG. 5 is a diagram of example components of a device in the system of FIG. 1.

FIG. 5 is a diagram of example components of a device 500, which may correspond to a network device (e.g., a server, a database, eNodeB 220, nodeB 310, RNC 330, SGW 410, MME 420, PGW 430, HSS 440, SGSN 450, and/or PCRF 460) in system 100. As shown in FIG. 5, device 500 may include a bus 510, a processor 520, a main memory 530, a read only memory (ROM) 540, a storage device 550, an input device 560, an output device 570, and a communication interface 580.

Bus 510 may include a path that permits communication among the components of device 500. Processor 520 may include a processor, a microprocessor, or processing logic (e.g., an application specific integrated circuit (ASIC) or a field programmable gate array (FPGA)) that may interpret and execute instructions. Main memory 530 may include a random access memory (RAM) or another type of dynamic storage device that may store information and instructions for execution by processor 520. ROM 540 may include a ROM device or another type of static storage device that may store static information and instructions for use by processor 520. Storage device 550 may include a magnetic and/or optical recording medium and its corresponding drive, or a removable form of memory, such as a flash memory.

Input device 560 may include a mechanism that permits an operator to input information to device 500, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 580 may include any transceiver-like mechanism that enables device 500 to communicate with other devices and/or systems. For example, communication interface 580 may include mechanisms for communicating with another network device.

As will be described in detail below, device 500 may perform certain operations relating to controlling radio resources. Device 500 may perform these and other operations in response to processor 520 executing software instructions contained in a computer-readable medium, such as main memory 530. A computer-readable medium may be defined as a non-transitory memory device. A memory device may include a space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 5 illustrates exemplary components of device 500, in other implementations, device 500 may include additional, fewer, different, or differently arranged components than those illustrated in FIG. 5 and described herein. As an example, in some implementations, input device 560 and/or output device 570 may not be implemented by device 500. In particular, device 500 may represent a network device such as eNodeB 220, nodeB 310, RNC 330, SGW 410, MME 420, PGW 430, HSS 440, SGSN 450, or PCRF 460. In these situations, device 500 may be a "headless" device that does not explicitly include an input or an output device.

Figure 6:
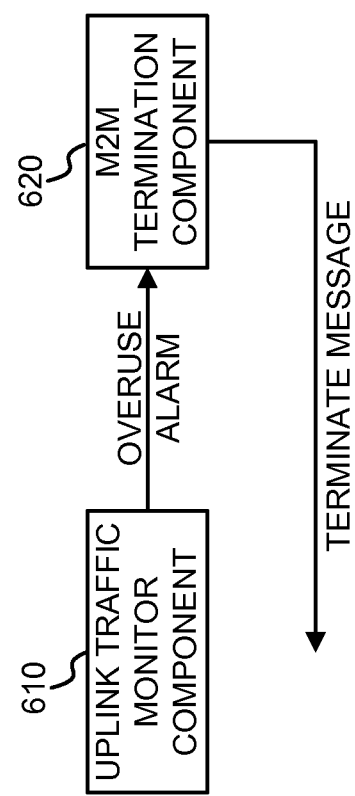
FIG. 6 is a diagram illustrating an example of functional components for limiting radio jamming of malfunctioning M2M devices.

FIG. 6 is a diagram illustrating an example of functional components 600 in system 100 for limiting radio jamming of malfunctioning M2M devices. Functional components 600 may particularly include uplink traffic monitor component 610 and a M2M termination component 620. In one implementation, uplink traffic monitor component 610 and M2M termination component 620 may be implemented in PGW 430 (or in other gateway devices, such as for a GPRS network, a gateway GPRS support node). Alternatively, uplink traffic monitor component 610 and M2M termination component 620 could be implemented in a different device in system 100 or implemented at separate devices in system 100.

Uplink traffic monitor component 610 may monitor M2M uplink traffic (i.e., traffic from M2M devices 140) to detect unusual data rate patterns in the traffic. The unusual data rate patterns may be detected as traffic that is consistently higher than a threshold, such as a configurable threshold or a threshold derived from the traffic contract associated with the device (e.g., a threshold derived from the guaranteed bit rate (GBR) or maximum bit rate (MBR) assigned to the M2M device). In one implementation, uplink traffic monitor component 610 may be implemented by a traffic policy enforcement engine within PGW 430, such as, in the 3GPP environment, a policy and charging enforcement (PCEF) entity. Uplink traffic monitor component 610 may communicate with PCRF 460 to obtain policy information or other parameters relating to an allowed uplink data rate of an M2M device. Other techniques for detecting unusually high traffic may be implemented, such as techniques that monitor average bandwidth, peak bandwidth, or other attributes related to traffic policing. In one particular implementation, a two rate, three color policing technique may be used. Another possible technique for determining unusually high traffic may be based on a Layer 7 (e.g., Intrusion Detection and Prevention (IDP)/L7 signature match) inspection of packets from M2M devices to determine malfunctioning M2M devices. In general, the technique used for detecting the unusually high uplink traffic for the M2M device may be designed to detect malfunctioning M2M devices due to both "natural" malfunctions or due to malicious activity.

Uplink traffic monitor component 610, when it detects an unusual traffic pattern, may signal M2M termination component 620 of the violation. For example, uplink traffic monitor component 610 may transmit a "M2M overuse alarm" to M2M termination component 620, indicating that the M2M device is a malfunctioning M2M device and should have its traffic terminated.

The operations performed by uplink traffic monitor component 610 may be applied only to traffic from M2M devices. Whether a connecting M2M device is a M2M device may be determined by an access point name (APN) assigned to the device. This may be applicable when the operator of system 100 assigns separate APNs for M2M devices. In situations in which the network operator does not assign separate APNs for M2M devices, other techniques may be used to determine whether a device is an M2M device. For example, a technique based on a passphrase may be used and is described in more detail below.

M2M termination component 620, in response to the M2M overuse alarm, may control and/or initiate termination of the corresponding M2M device from system 100. More particularly, M2M termination component 620 may issue messages to components in system 100 that result in the disconnection of the malfunctioning M2M device. The message causing the disconnection may, in addition to removing the bearer (i.e., the connection of the M2M device), may ensure that the malfunctioning M2M device is not allowed to reattach to the network for a time period. Advantageously, M2M devices that are malfunctioning, either because of malicious activity or due to device operational error, may be blocked from the network in a way that prevents the M2M devices from simply reconnecting to the network.

In one implementation, M2M termination component 620 may issue a "terminate message" to one or more nodes (i.e., nodes) in the network. The nodes, in response to receiving the terminate message, may remove the connection relating to the malfunctioning M2M device at each node which the message traverses. Additionally, at the radio interface node (e.g., the eNodeB or eNode) for the M2M device, the radio interface node may block the M2M device. For instance, the eNodeB may, in response to the terminate message, jam its radio interface to not allow the malfunctioning M2M device to latch onto a communication spectrum.

Although FIG. 6 illustrates example functional components 600, in other implementations, functional components 600 may include additional, fewer, different, or differently arranged functional components than those illustrated in FIG. 6 and described herein. Moreover, one or more of the functions performed by one of the functional components shown in FIG. 6 may be performed by other functional components shown in FIG. 6.

Figure 7:
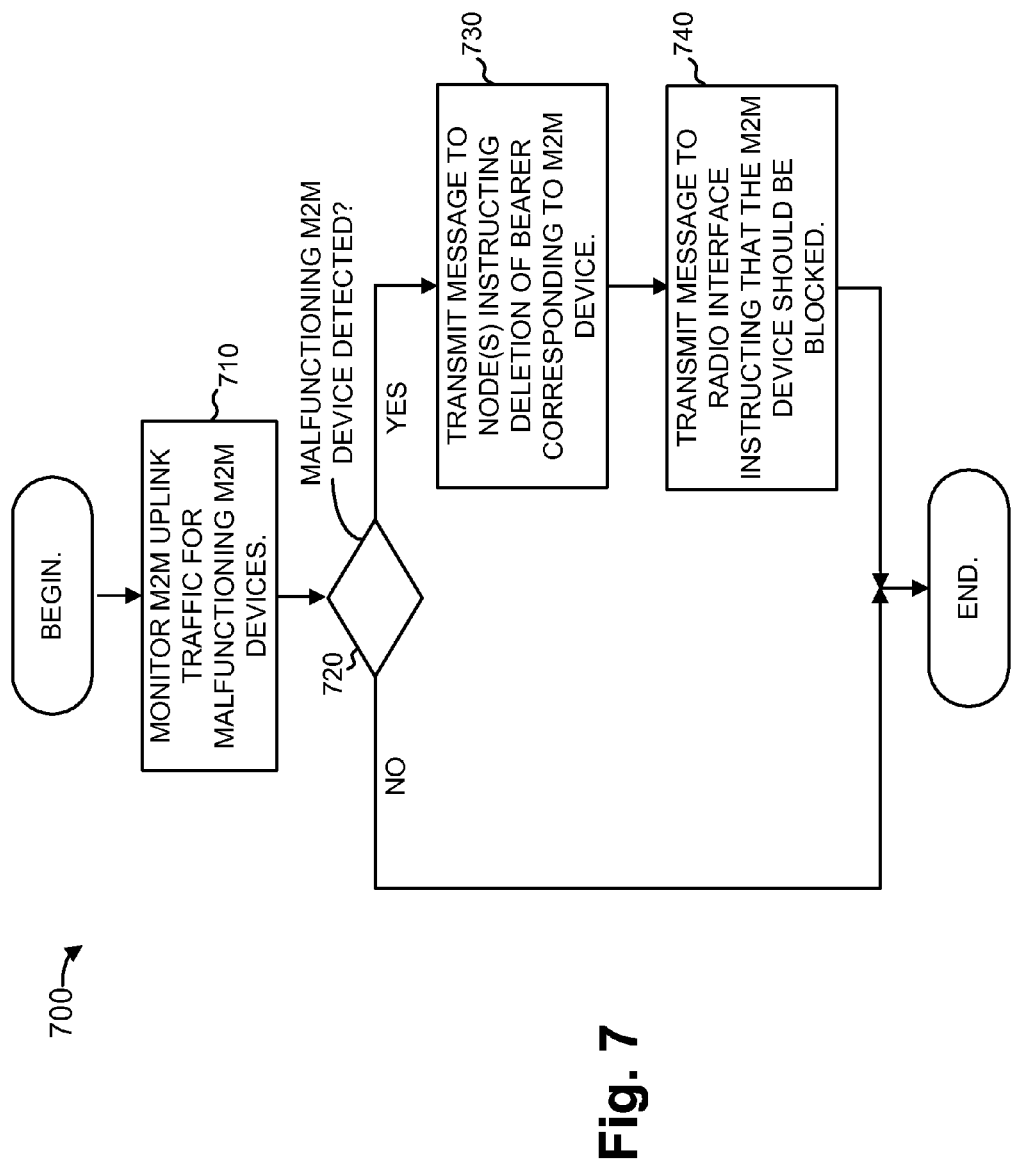
FIG. 7 is a flow chart illustrating an example process for limiting the connectivity of malfunctioning M2M devices.

FIG. 7 is a flow chart illustrating an example process 700 for limiting the connectivity of malfunctioning M2M devices.

Process 700 may include monitoring the M2M uplink traffic for malfunctioning M2M devices (block 710). As previously mentioned, in one implementation, a malfunctioning M2M device may be a M2M device that transmits at greater than a threshold level or rate of traffic. Whether a device is malfunctioning may be detected by uplink traffic monitor component 610 through the implementation of traffic policing policies. Uplink traffic monitor component 610 may be implemented in PGW 430, in another node in core network 110, or in another gateway device (e.g., a gateway GPRS support node). In general, traffic monitor component 610 may be configured to issue overuse alarms for M2M devices that are likely to be either malfunctioning or maliciously compromised in a way that causes the M2M device to use more uplink resources than is appropriate for the device.

When a malfunctioning M2M device is detected (block 720—YES), a message, indicating that the bearer (i.e., the communication session) corresponding to the M2M device should be deleted, may be transmitted to network devices (also called network "nodes" herein) in system 100 (block 730). Nodes that receive the message may respond by deleting communication session resources corresponding to the detected M2M device. The message may also include a time value indicating a time period for which the detected M2M device should not be allowed to re-connect to the network. For core network 110, the message may be sent by PGW 430 to SGW 410, which may further forward the message to MME 420 and/or SGSN 450.

Figure 8:
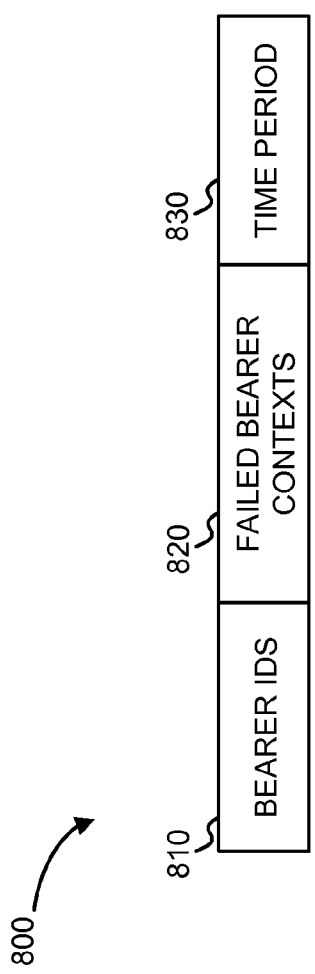
FIG. 8 is a diagram illustrating one possible example implementation for a message that instructs the deletion of the bearer corresponding to an M2M device.

FIG. 8 is a diagram illustrating one possible example implementation for a message 800 that instructs the deletion of the bearer corresponding to the M2M device (i.e., the message corresponding to block 730). In this implementation, the message may be a modified version of a "Delete Bearer Request" message, as defined in 3GPP Technical Specification 29.274. In particular, the message may be modified to include a time delay that indicates the time during which the detected M2M device should not be allowed to connect to the network.

As shown in FIG. 8, the Delete Bearer Request message may include a number of information elements, including a bearer IDs field 810, a failed bearer contexts field 820, and a time period field 830. For clarity, other information elements included in the Delete Bearer Request message (in the 3GPP Technical Specification 29.274) are not explicitly shown in FIG. 8. Bearer IDs field 820 may include an identification of one or more bearers (i.e., M2M device communication sessions) to which the Delete Bearer Request messages applies. Failed bearer contexts field 820 may be included in the Delete Bearer Request message when the message corresponds to a MME-initiated bearer deactivation procedure. In this case, failed bearer contexts field 820 may contain a list of failed bearers if partial bearer contexts could not be deleted. Time period field 830 may include an integer (or other numeric representation) time value that indicates the time period during which the malfunctioning M2M device(s) (i.e., the M2M devices identified in bearer IDs field 810) should not be allowed to connect to the network. The time period value may define, for instance, an integer number of seconds. A time delay value of "300" may thus mean, for example, that the bearer session corresponding to the specified M2M device should be deleted and the M2M device not allowed to reconnect for five minutes.

The value for time period field 810 may be determined in a number of ways. For instance, the value may be preset to a default value or set by a network administrator. In other implementations, the time value to use could be dynamically adjusted or set based on information relating to the M2M device. For example, M2M devices that were determined to be malfunctioning within the recent past may be associated with a higher time value. As another example, different types of M2M devices or M2M devices associated with different customers may be assigned different default time values.

As previously mentioned, message 800 may be transmitted to, received, and acted on by, for example, SGW 410 and MME 420. In general, the device transmitting message 800 may transmit the message to all nodes that take part in the bearer corresponding to the malfunctioning M2M device. In other implementations, other network devices may receive and act on message 800. For example, when applicable for core network 110, SGSN 450 may receive message 800.

Referring back to FIG. 7, a message may be transmitted to the radio interface (e.g., eNodeB, nodeB, etc.) corresponding to the detected M2M device, instructing the radio interface node that the M2M device should be blocked (block 740). The message may cause the radio interface node to block the radio of the malfunctioning M2M device. For instance, the radio interface node may jam the radio interface of the M2M device and not allow the M2M device to attach to the radio interface node. The message of block 740 may be transmitted to the radio interface nodes by one or more of PGW 430, SGW 410, and/or MME 420.

In one implementation, MME 420 may transmit the message of block 740 in response to reception of the message of block 730 (e.g., the Delete Bearer Request message). That is, MME 420, in response to receiving message 800 that includes a time period value greater than zero, may generate and forward the message(s) instructing the radio interface nodes, associated with the M2M device, to block the M2M device. In another possible implementation, the message of block 740 may be generated by, for example PGW 420, and forwarded to the radio interface node at the same time as message 800.

Figure 9:
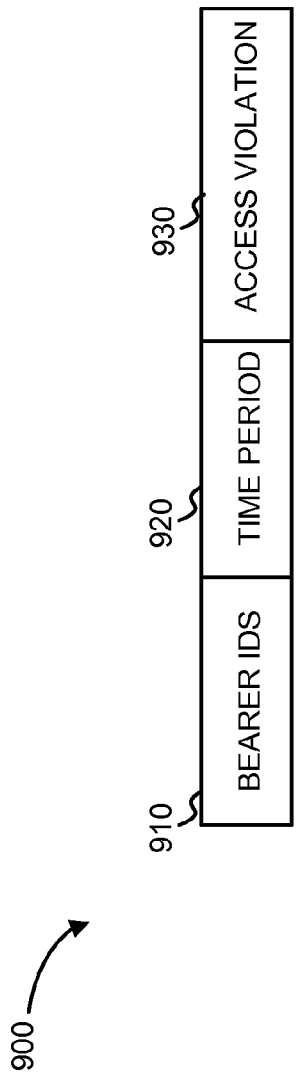
FIG. 9 is a diagram illustrating one possible implementation for a message that instructs the radio interface nodes to block a particular M2M device.

FIG. 9 is a diagram illustrating one possible implementation for a message 900 that instructs the radio interface nodes to block a particular M2M device (i.e., the message corresponding to block 740). The message may be a modified version of a "UE Context Release" message, as defined in the 3GPP Technical Specification 36.413. In particular, the message may be modified to include a time period that indicates the time during which the M2M device should be blocked by the radio interface node.

As shown in FIG. 9, message 900 may include a bearer ID identifier field 910, a time period field 920, and an access violation field 930. Bearer ID field 910 may identify the affected M2M device. Time period field 920 may indicate a time period for which the radio interface node should block the identifying M2M device. The value for the time period may be the same as the value of time period field 830 in message 800. Access violation field 930 may be set to indicate that the M2M device identified in field 910 is a malfunctioning M2M device.

Upon reception of message 900 at the radio interface node (e.g., eNodeB or NodeB), the radio interface node may release all related signaling and user data transport resources for the M2M device. The radio interface node may store the time period value and continue to block the M2M device until the time period in time period field 920 has expired.

Figure 10:
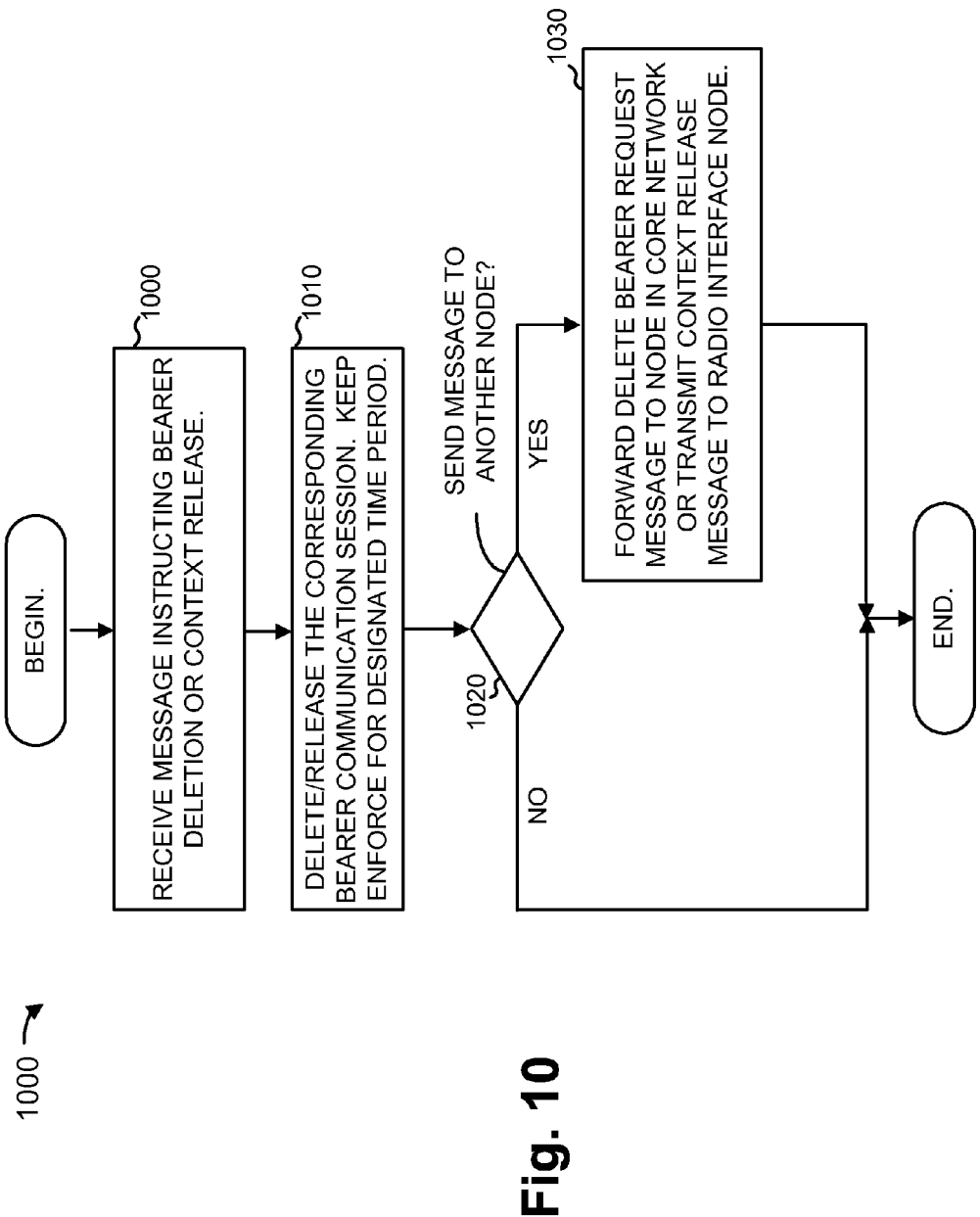
FIG. 10 is a flow chart illustrating an example process for limiting the connectivity of malfunctioning M2M devices.

FIG. 10 is a flow chart illustrating an example process 1000 for limiting the connectivity of malfunctioning M2M devices. Process 1000 may particularly be performed by network devices in system 100 that receive messages, such as messages 800 and 900, from other network devices.

Process 1000 may include receiving a message instructing bearer deletion (e.g., message 800) or bearer context release (e.g., message 900) (block 1000). As previously mentioned, message 800 may be received by nodes in core network 110, such as SGW 410 or MME 420. Message 900 may be received by a radio interface node, such as an eNodeB 210 or nodeB 310.

In response to the received message, process 1000 may further include deleting/releasing the corresponding bearer communication session (block 1010). As previously discussed, in response to message 800, the receiving node may delete the bearer session corresponding to the M2M device specified in message 800. The node may continue to not allow the M2M device to establish a communication session until the time value specified in time period field 830 elapses (block 1010). In an alternative implementation, the time period value may be effectively ignored by nodes processing 800 because, by blocking the M2M devices at the radio interface nodes, it may be assured that a new bearer session associated with the M2M device will not be established until the time period value elapses.

In response to message 900, in block 1010, the receiving radio interface node may, as previously mentioned, release the corresponding bearer communication session by releasing all related signaling and user data transport resources for the M2M device. The radio interface node may continue to block the M2M device until the time period in time delay field 920 has expired.

Some network devices, in some implementations, may forward a received message, or transmit another message, to another network device. SGW 410, for instance, may forward message 800 to MME 420. Process 1000 may further include determining if the network device should send a message to another network device in response to the received message (block 1020). When the network device should send a message to another network device (block 1020—YES), the network device may forward or transmit a message to the "next hop" network devices (block 1030). As mentioned, SGW 410, in response to receiving a Delete Bearer Request message, may forward the message to MME 420. MME 420, in response to receiving the Delete Bearer Request message, may transmit a UE Context Release message to the affected radio interface nodes.

Figure 11:
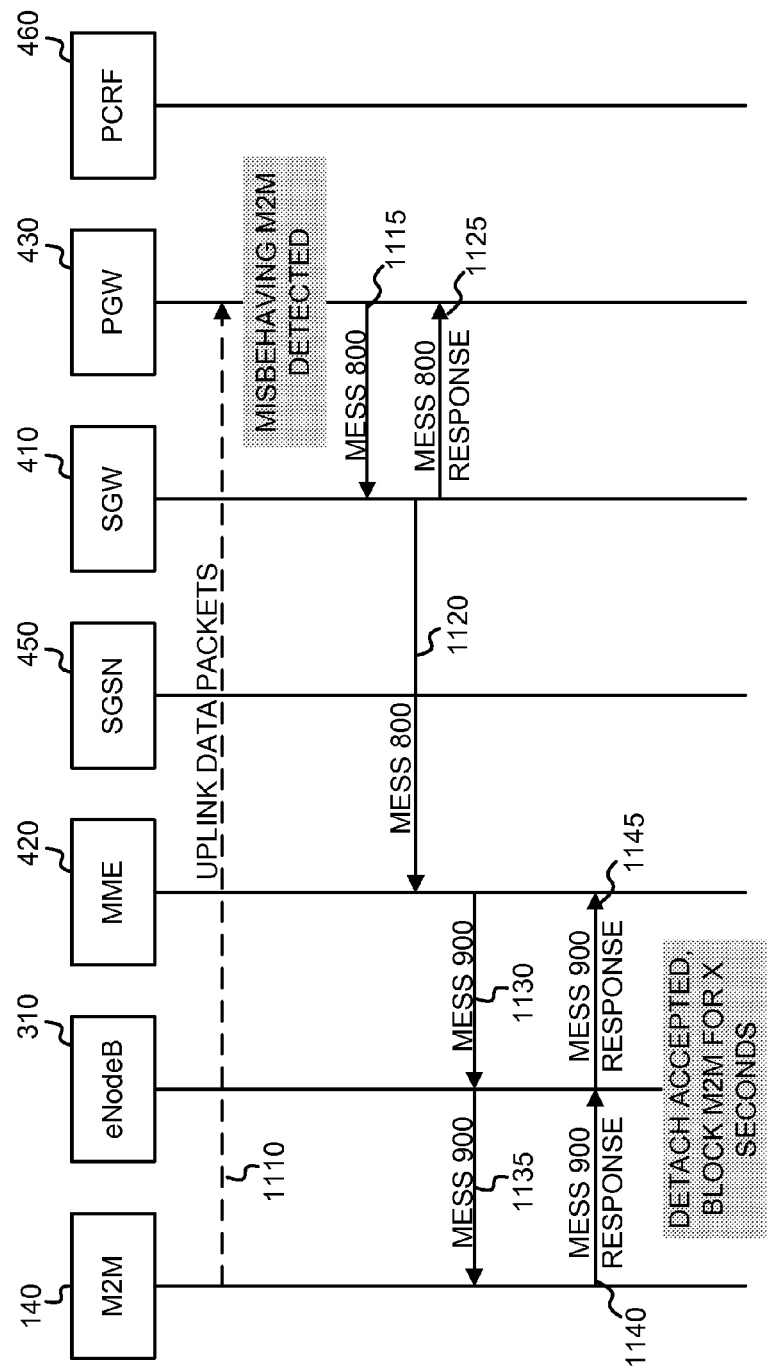
FIG. 11 is a diagram illustrating an example of a signal flow in which a M2M device is disconnected.

FIG. 11 is a diagram illustrating an example of a signal flow, in system 100, in which a M2M device is disconnected. As shown, uplink data packets 1110 may be sent from M2M device 140 to PGW 430 (flow 1110). As mentioned, PGW 430 may provide a gateway to an external network, such as network 150.

At some point, assume that PGW 430 (or another network device, such as PCRF 460), determines that M2M device 140 should be classified as malfunctioning. For instance, M2M device 140 may malfunction and begin to flood its radio interface with uplink traffic. PGW 430 may transmit a Delete Bearer Request message (MESS 800, flow 1115) to SGW 410. SGW 410 may process the message to delete the communication session of M2M device 140 and may forward the message to MME 420 (MESS 800, flow 1120). SGW 410 may also acknowledge the Delete Bearer Request message (MESS 800 RESPONSE, flow 1125).

In response to the received Delete Bearer Request message, MME 420 may transmit a UE Context Release message (MESS 900, flow 1130) to eNodeB 310. In some implementations, the Delete Bearer Request message may be further forwarded to M2M device 140 (MESS 900, flow 1135). In some implementations, M2M device 140 and/or eNodeB 310 may respond to the UE Context Release message to acknowledge the message (MESS 900 RESPONSE, flows 1140 and 1145). At this point, eNodeB 310 may block the radio interface data and signaling traffic, sent by M2M device 140, for the period (X seconds) indicated in message 900.

In the above description, M2M devices were described as being blocked from transmitting data to system 100 based on a policing action performed by uplink traffic monitor component 610. As previously mentioned, whether a connecting device is a M2M device may be determined by the access point name (APN) assigned to the device. In some situations, however, the network operator may not assign separate APNs for M2M devices. In this case, other techniques may be used to determine whether a device is a M2M device. In one such other technique, when uplink traffic monitor component 610 detects a malfunctioning device of an unknown type (i.e., it is not known if the malfunctioning device is a M2M device or a human operated device), uplink traffic monitor component 610 may contact a pre-defined authentication server to obtain the type of device. In one implementation, the authentication server may operate based on a pass code principle. For example, the authentication server may transmit a random string value to the device and request that the user of the device enter and send back the string. If the user does not send back the correct string, the authentication server may indicate that the device is a M2M device.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 7 and 10, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
    determining, by a network device, a threshold based on a bit rate assigned to a machine to machine (M2M) device;
    determining, by the network device, an uplink data rate of the M2M device based on uplink traffic from the M2M device;
    determining, by the network device, that the M2M device is malfunctioning based on the threshold and the uplink data rate; and
    transmitting, by the network device and after determining that the M2M device is malfunctioning, one or more messages instructing other network devices to perform deletion of one or more communication sessions corresponding to the M2M device,
        at least one of the one or more messages being associated with a time period value identifying a time period when the deletion of the one or more communication sessions is to be enforced.

2. The method of claim 1, where the M2M device is a wireless device.

3. The method of claim 1,
    where the one or more messages include a message to one or more radio interface nodes instructing the one or more radio interface nodes to block wireless access for the M2M device, and
    where the other network devices include the one or more radio interface nodes.

4. The method of claim 3, where the wireless access for the M2M device is blocked for the time period.

5. The method of claim 1, where the one or more messages include a modified version of a Delete Bearer Request message or a UE Context Release message.

6. The method of claim 1, where the network device includes a gateway device to a packet-based network.

7. The method of claim 1, where determining that the M2M device is malfunctioning includes:
    determining that the M2M device is malfunctioning based on the uplink data rate being higher than the threshold.

8. The method of claim 1, further comprising:
    determining that a different M2M device is malfunctioning based on a Layer 7 Intrusion Detection and Prevention (IDP) inspection of traffic received from the different M2M device, and
    transmitting, after determining that the different M2M device is malfunctioning, one or more different messages to delete one or more different communications corresponding to the different M2M device.

9. A network device comprising:
    one or more processors to:
        determine a threshold based on a bit rate assigned to a machine to machine (M2M) device,
        determine an uplink data rate of the M2M device based on uplink network traffic received from the M2M device,
        determine that the M2M device does not satisfy a policy for the M2M device based on the threshold and the uplink data rate, and
        transmit, after determining that the M2M device does not satisfy the policy, one or more messages instructing one or more other devices to delete communication sessions corresponding to the M2M device.

10. The device of claim 9, where the policy for the M2M device is based on a policy to detect malfunctioning or maliciously compromised M2M devices.

11. The device of claim 9,
where the one or more messages are associated with a time period value that specifies a time period when a radio interface is to be blocked for the M2M device by at least one radio interface node, and
where the one or more other network devices include the at least one radio interface node.

12. The device of claim 9,
where the device includes a packet data network gateway (PGW) device, and
where the one or more other devices include at least one of a serving gateway (SGW) device or a mobility management entity (MME) device.

13. The device of claim 9, where the one or more messages include a message to one or more radio interface nodes instructing the one or more radio interface nodes to block wireless access for the M2M device.

14. The device of claim 9, where the one or more messages include a modified version of a Delete Bearer Request message or a UE Context Release message.

15. The device of claim 9, where, when determining that the M2M device does not satisfy the policy, the one or more processors are to:
determine that the M2M device does not satisfy the policy based on the uplink data rate being higher than the threshold.

16. The device of claim 9, where the one or more processors are further to:
determine that a different M2M device does not satisfy a different policy based on a Layer 7 Intrusion Detection and Prevention (IDP) inspection of traffic received from the different M2M device, and
transmit, after determining that the different M2M device does not satisfy the different policy, one or more different messages to delete one or more different communications corresponding to the different M2M device.

17. A non-transitory computer-readable medium storing instructions, the instructions comprising:
one or more instructions; that, when executed by at least one processor, cause the at least one processor to:
determine a threshold based on a bit rate assigned to a machine to machine (M2M) device,
determine an uplink data rate of the M2M device based on uplink data traffic from the M2M device,
determine that the M2M device is malfunctioning based on the threshold and the uplink data rate, and
transmit, after determining that the M2M device is malfunctioning, one or more messages instructing one or more network devices to delete communication sessions corresponding to the M2M device.

18. A system comprising:
a gateway device to:
determine a threshold based on a bit rate assigned to a machine to machine (M2M) device in a network,
determine an uplink data rate of the M2M device based on uplink network traffic received from the M2M device,
determine that the M2M device is malfunctioning based on the threshold and the uplink data rate, and
transmit, after determining that the M2M device is malfunctioning, a message instructing to delete communication sessions corresponding to the M2M device.

19. The system of claim 18, where the messages includes a modified version of a Delete Bearer Request message or a UE Context Release message.

20. The system of claim 18, further comprising:
a serving gateway (SGW) device to:
receive the message,
remove a communication session, of the communication sessions, based on the message; and
a mobility management entity (MME) device to:
receive the message and, in response to
remove a communication session, of the communication sessions, device based on the message.

21. The system of claim 18, further comprising:
an interface node to:
provide an interface for connection of the M2M device to the network,
receive the message, and
block, after receiving the message, the M2M device from connecting to the network for a time period indicated in the message.

22. The non-transitory computer-readable medium of claim 17, where the instructions further comprise:
one or more instructions that, when executed by at least one processor, cause the at least one processor to:
determine that a different M2M device is malfunctioning based on a Layer 7 Intrusion Detection and Prevention (IDP) inspection of traffic received from the different M2M device, and
transmit, after determining that the different M2M device is malfunctioning, one or more different messages to delete one or more different communications corresponding to the different M2M device.

* * * * *

UNITED STATES PATENT AND TRADEMARK OFFICE
CERTIFICATE OF CORRECTION

| | | |
|---|---|---|
| PATENT NO. | : 8,565,755 B1 | Page 1 of 1 |
| APPLICATION NO. | : 12/895632 | |
| DATED | : October 22, 2013 | |
| INVENTOR(S) | : Badakere Ramachandra et al. | |

It is certified that error appears in the above-identified patent and that said Letters Patent is hereby corrected as shown below:

In the Claims

Claim 9 (Column 12, Line 51) should read as follows:

A device comprising:

Claim 20 (Column 14, Lines 25-27) should read as follows:

receive the message, and remove a communication session, of the communication sessions, based on the message.

Signed and Sealed this
Eighteenth Day of March, 2014

Michelle K. Lee
*Deputy Director of the United States Patent and Trademark Office*